United States Patent [19]

Hunt et al.

[11] Patent Number: 4,948,679
[45] Date of Patent: Aug. 14, 1990

[54] MICROSCREEN RADIATION SHIELD FOR THERMOELECTRIC GENERATOR

[75] Inventors: Thomas K. Hunt, Ann Arbor; Robert F. Novak, Farmington Hills; James R. McBride, Ypsilanti, all of Mich.

[73] Assignee: Ford Motor Company, Dearborn, Mich.

[21] Appl. No.: 359,820

[22] Filed: Jun. 1, 1989

[51] Int. Cl.$^5$ ............... H01M 16/00; H01M 6/36
[52] U.S. Cl. ............................. 429/11; 429/120
[58] Field of Search ............................. 429/11, 120

[56] References Cited

U.S. PATENT DOCUMENTS

| | | | |
|---|---|---|---|
| 4,042,757 | 8/1977 | Jones | 429/120 |
| 4,235,956 | 11/1980 | Gross et al. | 429/120 |
| 4,383,013 | 5/1983 | Bindin et al. | 429/120 |

*Primary Examiner*—Donald L. Walton
*Attorney, Agent, or Firm*—Randolph A. Smith; Roger L. May

[57] ABSTRACT

The present invention provides a microscreen radiation shield which reduces radiative heat losses in thermoelectric generators such as sodium heat engines without reducing the efficiency of operation of such devices. The radiation shield is adapted to be interposed between a reaction zone and a means for condensing an alkali metal vapor in a thermoelectric generator for converting heat energy directly to electrical energy. The radiation shield acts to reflect infrared radiation emanating from the reaction zone back toward the reaction zone while permitting the passage of the alkali metal vapor to the condensing means. The radiation shield includes a woven wire mesh screen or a metal foil having a plurality of orifices formed therein. The orifices in the foil and the spacing between the wires in the mesh is such that radiant heat is reflected back toward the reaction zone in the interior of the generator, while the much smaller diameter alkali metal atoms such as sodium pass directly through the orifices or along the metal surfaces of the shield and through the orifices with little or no impedance.

21 Claims, 2 Drawing Sheets

MICROSCREEN RADIATION SHIELD FOR THERMOELECTRIC GENERATOR

BACKGROUND OF THE INVENTION

This invention was made under contract with or subcontract thereunder of the Department of Energy Contract No. DE-AC02-83CE40651.

This invention relates to thermoelectric generator devices which convert heat energy from a heat source directly to electrical energy by electrochemically expanding alkali metal across a solid electrolyte and to radiation shields for use in such generators. More particularly, this invention relates to radiation shields in such devices interposed between the solid electrolyte and condenser surface of the generator for reflecting back heat radiating from the electrolyte surface to improve the efficiency of the generator.

Thermoelectric generators are known, and their construction and principles of operation have been described, for example, in U.S. Pat. Nos. 4,094,877, 4,098,958, and 4,510,210, among others. The name commonly given to such thermoelectric generators, which electrochemically expand an alkali metal across a solid electrolyte, is "sodium heat engine". Sodium is typically the alkali metal of choice in such devices, and while other alkali metals may be employed, the sodium heat engine which is described herein is exemplary of such generators.

A typical sodium heat engine comprises a closed container separated into first and second reaction zones by a solid electrolyte. Liquid sodium metal is present in the first reaction zone on one side of the solid electrolyte and is maintained, during operation of the engine, at a pressure higher than that of the second reaction zone. In the lower pressure second reaction zone, a permeable, electrically conductive electrode is in contact with the solid electrolyte.

During operation of the engine, a heat source raises the temperature of the sodium in the first reaction zone to above its melting point. The high temperature liquid sodium metal also has a corresponding high vapor pressure which creates a sodium vapor pressure differential across the solid electrolyte. In response to this pressure differential, the liquid elemental sodium gives up electrons to an electrode in contact with the sodium metal. The resulting sodium ions then migrate through the solid electrolyte.

The electrons, having passed through an external load, then neutralize sodium cations at the permeable electrode/solid electrolyte interface. Elemental sodium metal evaporates from the permeable electrode and migrates through the lower pressure second reaction zone (preferably, a near vacuum space) to a lower temperature condenser. The condensed liquid sodium may then be collected and returned back to the higher temperature first reaction zone to complete the closed cycle. This may be accomplished, for example, by means of a return line and electromagnetic pump.

The process occurring in the solid electrolyte and at the sodium/electrolyte and electrode/electrolyte interfaces is nearly equivalent to an isothermal expansion of the sodium metal from the higher to lower pressure zones at the temperature maintained in the first reaction zone. No mechanical parts need move. The work output of the engine converts heat directly to electricity.

The relationships of output current and voltage at an upper operating temperature $T_2$ in such thermoelectric generators has been previously approximated as:

$$V = \frac{RT_2}{F} \ln \frac{(P_2)}{(P_1 + \zeta(i))} - iR_o \qquad \text{Eq. (1)}$$

where R is the gas constant of $8.32 \times 10^3$ J/mole K; F is the Faraday constant of $9.652 \times 10^7$ coul/mole; $P_2$ and $P_1$ are the vapor pressures of alkali metal as sodium at the upper $T_2$ and lower $T_1$ operating temperatures, respectively; $\zeta(i)$ i the effective pressure due to the current i; and $R_o$ is the internal resistance. Also previously derived is an approximate mathematical expression for the efficiency of such generators which may be written as:

$$= \frac{iV}{iV + \frac{i}{F}(L + \Delta H) + \frac{\sigma}{Z}(T_2^4 - T_1^4) + K(T_2 - T_1)} \qquad \text{Eq. (2)}$$

where L is the latent heat of vaporization for alkali metal; $\Delta H$ is the change in enthalpy of the alkali metal as it is heated from $T_1$ back up to $T_2$; $\sigma$ is the Stefan-Boltzmann constant; Z is the factor by which radiative transfer of heat from the hot electrode surface at $T_2$ to the cold surface condenser at $T_1$ is reduced by the reflectivity of the condenser and the emissivity of the electrode surface; and K is the effective thermal conductance of the electrical leads which bring the power from $T_2$ to the outside $T_1$.

In Equation 2, all of the terms, losses, and power output are per unit area and, accordingly, generally increase or decrease linearly with the active surface area of the generator when the electrode/electrolyte surface and the condenser surface are parallel to each other. The first two terms in the denominator in Equation 2 are inherent to the operation of the generator, while the third and fourth terms are parasitic losses. Of these, the third (radiation loss) term is very important, and the losses may be substantial even with relatively high values for Z.

Attempts have been made in the past to reduce radiation losses by interposing a radiation shield between the electrode and condenser. See, for example, Bettman, U.S. Pat. No. 4,098,958. However, it is important for desired operation of such generators that the neutral alkali metal atoms be able to migrate easily from the porous electrode to the condenser in numbers adequate to account for the output current of the device. Interposition of such a shield impedes the passage of sodium vapor and may cause an increase in the pressure $P_1$ (see Equation 1). This leads to a consequent decrease in the operating voltage of the generator. This, in turn, may result, if no other changes are made, in a substantial reduction of power output of the generator.

If, on the other hand, the generator is merely increased in size while the path between the electrode and condenser remains unobstructed, the total output power will increase, but the losses due to radiation and conduction will also increase in direct proportion because the area which radiates heat will correspondingly be increased (see Equation 2). Accordingly, there remains a need in the art for a means to reduce radiative heat losses in a thermoelectric generator but without the concomitant impedance of sodium passage and pressure increase problems associated with prior art attempted solutions.

SUMMARY OF THE INVENTION

The present invention meets that need by providing a microscreen radiation shield which reduces radiative heat losses in thermoelectric generators such as sodium heat engines without substantially reducing the efficiency of operation of such devices. In accordance with one aspect of the present invention, a radiation shield is provided which is adapted to be interposed between a reaction zone and a means for condensing an alkali metal vapor in a thermoelectric generator for converting heat energy directly to electrical energy. The radiation shield acts to reflect infrared radiation emanating from the reaction zone back toward the reaction zone while permitting the passage of the alkali metal vapor to the condensing means.

Passage of the alkali metal vapor is achieved by providing a plurality of orifices in the radiation shield which are spaced such that a substantial portion of the alkali metal vapor impinging upon the the radiation shield is transported to and through the orifices. The size and spacing of the orifices is such, however, that the radiation shield is substantially opaque to infrared radiation which is reflected back toward the reaction zone.

In a preferred embodiment, the radiation shield substantially surrounds the reaction zone and extends substantially the length thereof. While the radiation shield may have a cylindrical configuration, other geometries are possible including the use of multi-sided planar configurations.

The radiation shield of the present invention includes a plurality of orifices of a width of from about 0.1 to about 1000 micrometers, and preferably from about 0.1 to about 500 micrometers. The spacing between orifices is preferably in the range of from about 0.01 to about 2.0 millimeters. Such a shield having orifices of the aforementioned widths and spacing may be produced in any of a number of ways. In one preferred construction, the radiation shield comprises a woven wire mesh screen having the aforementioned spacing between individual wires. The wire mesh is of a material which can withstand the high temperatures of operation of a thermoelectric generator and preferably is woven from a metal selected from the group consisting of copper, silver, aluminum, nickel, molybdenum, and tungsten.

The reflective capabilities of woven wire mesh screen may be enhanced by flattening the screen wires by rolling. When so flattened, less of the thermal radiation from the electrode is scattered forward through the screen toward the condenser from the edges of the wires comprising the mesh, and the reflectivity is correspondingly enhanced.

In an alternate construction, the radiation shield comprises a metal foil having a plurality of orifices formed therein. Again, the material used must be able to withstand the high temperatures of operation and is preferably a metal selected from the group listed above. The orifices in the foil and the spacing between the wires in the mesh is such that radiant heat, having a wavelength on the scale of from about 1 to 10 micrometers, is reflected back toward the reaction zone in the interior of the generator, while the much smaller diameter alkali metal atoms such as sodium pass through or along the metal surfaces of the shield to the orifices with little or no impedance.

In a preferred embodiment, a plurality of woven wire mesh screens are stacked in layers to form the radiation shield, with wires in adjacent layers being offset from one another such that the radiation shield is substantially opaque to infrared radiation while permitting the passage of the alkali metal vapor. Where a metal foil construction is utilized, a plurality of such metal foils may be stacked in layers with orifices in adjacent layers being offset from one another such that the radiation shield is substantially opaque to infrared radiation while permitting the passage of the alkali metal vapor.

The present invention also provides an improved thermoelectric generator wherein heat energy is converted directly to electrical energy which includes a first reaction zone containing elemental alkali metal and a second reaction zone including an electrode in fluid communication with the first reaction zone. The generator also includes a reaction zone separator comprising a cationically conductive solid electrolyte, means for conducting electron flow between the first and second reaction zones, means for maintaining a temperature in the first reaction zone at least 100 degrees C in excess of the lowest temperature in the second reaction zone, means for condensing elemental alkali metal vapor leaving the second reaction zone, and means for returning condensed elemental alkali metal from the second reaction zone to the first reaction zone.

The radiation shield of the present invention is interposed between the second reaction zone and the condensing means for reflecting infrared radiation from the second reaction zone back toward the second reaction zone while permitting the passage of the alkali metal vapor to the condensing means. In its preferred form, the radiation shield substantially surrounds the second reaction zone and extends substantially the length thereof.

Again, in a preferred construction, the radiation shield in the thermoelectric generator includes a plurality of orifices of a width of from about 0.1 to about 1000 micrometers and a spacing between orifices in the range of from about 0.01 to about 2.0 millimeters and may comprise either a woven wire mesh screen or a metal foil having a plurality of orifices formed therein. The woven wire mesh screen or foil is of a material which can withstand the high temperatures of operation of a thermoelectric generator and preferably is fabricated from a metal selected from the group consisting of copper, silver, aluminum, nickel, molybdenum, and tungsten.

In a preferred embodiment, the radiation shield in the thermoelectric generator includes a plurality of the woven wire mesh screens stacked in substantially concentric layers with wires in adjacent layers being offset from one another such that the radiation shield is substantially opaque to infrared radiation while permitting the passage of the alkali metal vapor. In the alternative construction utilizing metal foils, a plurality of the metal foils are stacked in substantially concentric layers with orifices in adjacent layers being offset from one another such that the radiation shield is substantially opaque to infrared radiation while permitting the passage of the alkali metal vapor.

Accordingly, it is an object of the present invention to provide a radiation shield for a thermoelectric generator which reduces radiative heat losses from the device without substantially reducing its output power density. This, and other objects and advantages of the present invention, will become apparent from the following detailed description, the accompanying drawings, and the appended claims.

DETAILED DESCRIPTION OF THE PREFERRED EMBODIMENTS

Figure 1:
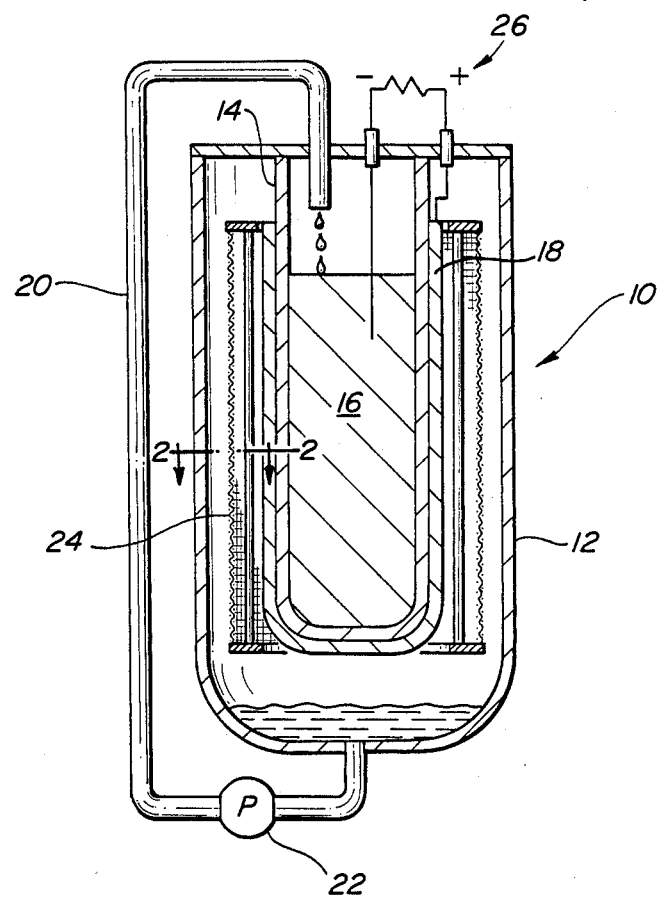
FIG. 1 is a schematic diagram of a typical thermoelectric generator having the microscreen radiation shield of the present invention.

Referring now to FIG. 1, an exemplary thermoelectric generator structure is shown schematically and in vertical cross section with the microscreen radiation shield of the present invention. As will be apparent to those skilled in the art, the microscreen radiation shield of the present invention may be adapted for thermoelectric generators having differing constructions. As shown in FIG. 1, the generator 10 is housed in a chemically resistant tube 12 of a material such as stainless steel, ceramic, or the like. A vacuum tight seal of tube 12 is provided by any suitable means such as a cover plate secured by threads or bolts and sealed by gaskets (not shown).

Positioned inside tube 12 is a smaller tube 14 which comprises the solid electrolyte. Tube 14 is filled, partially or completely with an alkali metal 16 such as sodium and forms a first reaction zone. Portions of the outer surface of electrolyte tube 14 are provided with a thin, electrically conductive electrode 18 which is permeable enough to permit sodium to pass therethrough and sufficiently thick and continuous to conduct electricity. Electrode 18 forms a second reaction zone. Electrode 18 is shown disproportionately thick in relation to other components of the generator to facilitate its location and identification.

Generator 10 also includes a return line 20 which collects liquid alkali metal which has condensed on the inner walls of tube 12 and returns it to tube 14. An electromagnetic pump 22 is located in return line 20 to pump the liquid alkali metal. A microscreen radiation shield 24 is positioned between electrode 18 and the walls of tube 12 to reflect infrared radiation emanating from tube 14 and electrode 18 back toward those elements while permitting the passage of alkali metal vapor to the condensing walls of tube 12.

As is conventional, generator 10 may be equipped with a vacuum pump (not shown) to reduce the pressure inside tube 12. Further, generator 10 may also be equipped with a heat source to maintain the temperature in tube 14 at least 100 degrees C. in excess of the lowest temperature in tube 12. Such a heat source may comprise a heating device immersed in the alkali metal 16 in tube 14.

In operation, tube 12 is evacuated to a pressure lower than about 0.1 torr, preferably lower than about 0.001 torr, and then sealed. Alkali metal such as sodium within tube 14 is heated to a temperature of from about 300 to 1000 degrees C. by suitable means known in the art. The portion of tube 12 near its external walls is maintained at a temperature at least 100 degrees C. below that of the alkali metal in tube 14 by means such as thermal exchange with ambient temperature air or other coolant fluids. A difference in alkali metal vapor pressure on the opposite sides of electrolyte tube 14 results in the creation of a difference in electrical potential across the electrolyte. As electrons flow through the external circuit, schematically indicated by reference numeral 26, alkali metal 16 passes through electrolyte tube 14 in the form of cations. The alkali metal cations then accept electrons from electrode 18 and return to their elemental state.

If the portions of tube 12 near its outer walls are maintained at their desired temperature of at least 100 degrees C. lower than the alkali metal in tube 14, elemental alkali metal vapor which has passed through electrode 18 condenses on those walls. The pressure in tube 12 becomes the vapor pressure of the alkali metal modified by any vapor pressure drop produced by the mass flow of the alkali metal from electrode 18 to the cooler walls of tube 12. In continuous operation, the condensed alkali metal is collected at the bottom of tube 12 and is returned to the first reaction zone in tube 14 by a return line 20 and pump 22.

In the practice of the present invention, the preferred alkali metal reactant is sodium. However, potassium and other alkali metals may be used if the electrolyte separator tube is of compatible material. The solid electrolyte tube may be fabricated of glass, ceramic, or polycrystalline ceramic material. Among the ceramic materials which may be used, and which demonstrate an unusually high resistance to attack by alkali metal, are the alkali metal beta aluminas. Such ceramic materials are known in the art and discussed in Saillant, U.S. Pat. No. 4,049,877, the disclosure of which is hereby incorporated by reference.

The electrode 18 is permeable enough to permit alkali metal vapors to pass therethrough, but of sufficient thickness to conduct electricity. It may comprise, for example, a thin conducting layer of platinum bright paint comprising platinum chloride, or molybdenum films applied by sputtering or by other means such as those described in the aforementioned U.S. Pat. No. 4,049,877.

As previously described, one of the principal loss mechanisms in thermoelectric generators is the radiative heat loss from the relatively hotter electrode in the interior of the device to the relatively cooler exterior condensing wall surfaces. As shown by Equation 2 above, such radiative heat losses may be substantial and cause a significant reduction in the efficiency of the device. The present invention addresses the problem of such radiative heat losses by interposing a radiation shield 24, shown schematically in FIG. 1, between the hot electrode 18 and the condensing wall surfaces of tube 12. While radiation shield 24 is illustrated in a cylindrical configuration, it will be appreciated that other geometries may be used including planar panels with the individual panels being stacked and offset from one another or multi-sided planar configurations with individual panels being brazed or sealed together.

Radiation shield 24 includes a plurality of orifices of a width of between about 0.1 to about 1000, and preferably of between about 0.1 to about 500, micrometers.

Figure 4:
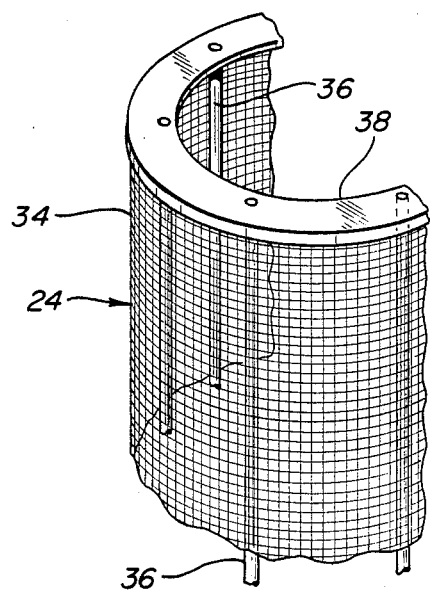
FIG. 4 is an enlarged perspective view, partially broken away, of the wire mesh screen embodiment of the radiation shield of the present invention.
Figure 5:
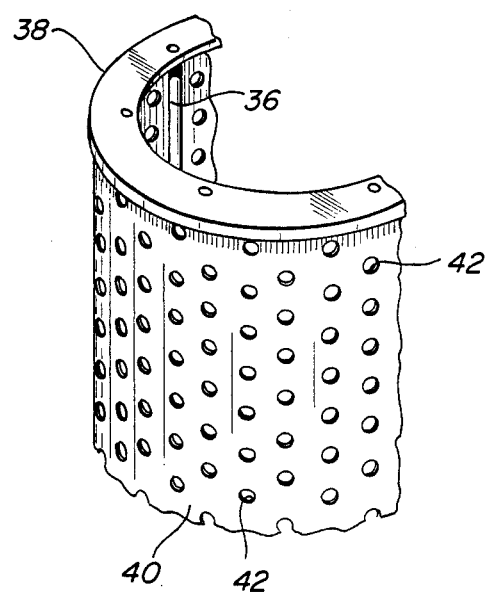
FIG. 5 is an enlarged perspective view, partially broken away, of the metal foil embodiment of the radiation shield of the present invention.

The radiation shield having such orifices may be formed in a number of ways. In one preferred construction of the radiation shield as best illustrated in FIG. 4, the radiation shield 24 comprises a woven wire mesh screen having the aforementioned spacing between individual wires 34. The reflective capabilities of the mesh screen may be enhanced by flattening the screen wires as by rolling. For greater stability, the shield structure may be reinforced, such as by vertical rods 36 in conjunction with flange 38. In another embodiment of the invention illustrated in FIG. 5, radiation shield 24 comprises a metal foil 40 having a plurality of orifices 42 formed therein.

The radiation shield of the present invention is maintained at a temperature between that of the electrode 18 and the cooler condenser wall surfaces. In practice this temperature is in the range of from about 300 to about 600 degrees C. Suitable materials for use in the radiation shield include materials which are good reflectors of infrared radiation and which are able to withstand the high operating temperatures of the thermoelectric generator environment. Suitable materials include a number of metals including copper, silver, aluminum, nickel, molybdenum, and tungsten.

The radiation shield of the present invention is based, at least in part, on the relatively high mobility of alkali metals such as sodium on the surfaces of metals at high temperatures. Any shield which includes both solid portions and a plurality of orifices must be of such dimensions that the movement of the alkali metal vapor from the electrode to the condenser wall surface is not substantially impeded. Otherwise, a back pressure will build up and increase the pressure, $P_1$, in the space between the electrode and condenser wall. As previously described by Equation 1 above, such an increase in this pressure may decrease the power output of the generator. It has been found that the radiation shield may have a relatively small percentage of open area, i.e., less than about 40%, and still not seriously impede the passage of the alkali metal atoms.

This is because the alkali metal vapor which impinges upon the solid portions of the radiation shield condenses and is quickly transported along and around the surface of the shield reaching a nearly uniform distribution under steady state conditions. The alkali metal on the condenser-facing surface can then evaporate through an orifice or to the surface of an adjacent shield, and finally from the last such shield to the condenser. As long as the dimensions and spacing of the orifices in the shield structure are such that the path length of the alkali metal is short enough so that the surface transport of the alkali metal along the metal surface is completed before reevaporation occurs, the shield will function to pass alkali metal atoms with no deleterious pressure build up.

Figure 2:
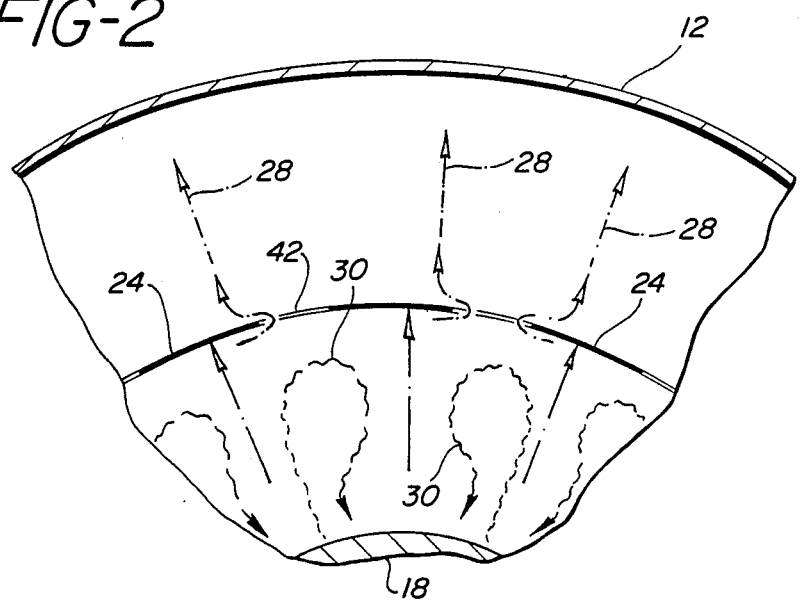
FIG. 2 is an enlarged cross-sectional view taken along line 2—2 in FIG. 1 illustrating the reflection of radiation and the passage of sodium vapor by the microscreen radiation shield of the present invention.

Thus, as shown schematically in FIG. 2, the path of alkali metal vapor 28 as it impinges upon radiation shield 24 is such that the vapor condenses, is transported along and around the surface of the shield and through an orifice, and then reevaporates and continues on its path to the condenser wall surface of tube 12. Of course, for those alkali metal vapor atoms which directly pass through the orifices in the shield, there is no impedance. Infrared radiation, indicated by arrows 30, impinges upon the radiation shield and is reflected back toward the interior of the device.

As discussed above, the dimensions of the solid areas in the radiation shield must be sufficiently small so that the alkali metal surface transport mechanism across the shield can carry the alkali metal atoms to the condenser-facing wall surface of the device prior to reevaporation. Preferably, the solid portions of the radiation shield, whether it be the wire of the woven mesh embodiment or the metal foil of the alternate embodiment, have widths of from about 0.01 to about 2.0 millimeters, with a spacing between solid portions of from about 0.1 to about 1000 micrometers, and preferably of from about 0.1 to about 500 micrometers. For the wire woven mesh, circular diameter wires may be used; however, flattened wires, rectangular wires or wires which even have a concave-type of surface may also be used. For the metal foil embodiment, the curvature of the foil will aid in reflecting thermal radiation back toward the electrode. The orifices formed may be of any configuration. They may be, for example, circular, elliptical, rectangular, or irregular in shape.

Figure 3:
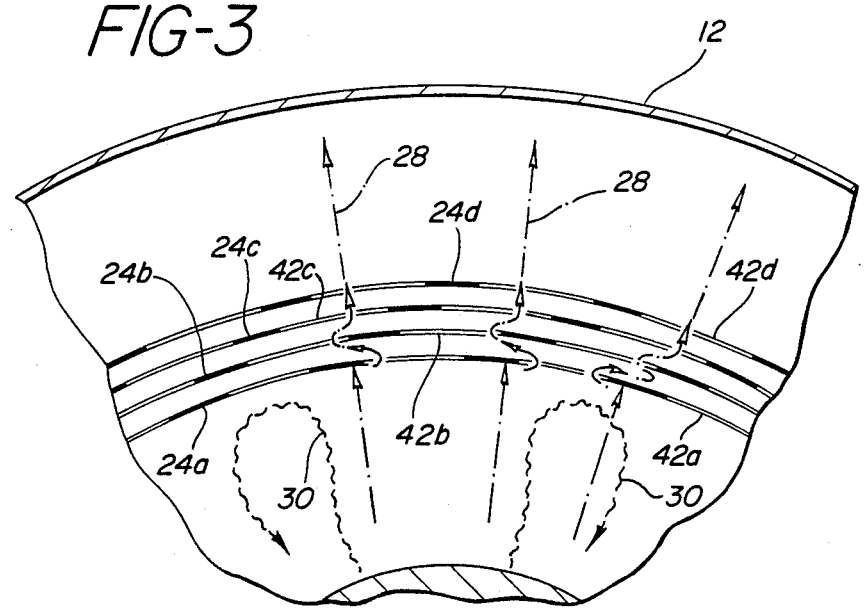
FIG. 3 is an enlarged cross-sectional view similar to FIG. 2 illustrating a preferred embodiment of a plurality of concentric offset microscreen radiation shields.

In another embodiment of the invention schematically illustrated in FIG. 3, a plurality of radiation shields 24a, 24b, and 24c may be stacked around electrode 18. While FIG. 3 illustrates a preferred embodiment utilizing cylindrically-shaped shields stacked in a substantially concentric pattern, it will be appreciated that other geometries of shields and stacking patterns may be used as previously described. The radiation shields are spaced from each other and orifices 42a, 42b, 42c, and 42d in respective shields 24a, 24b, 24c, and 24d are offset from each other such that the stacked shield are substantially opaque to thermal radiation. That is, for infrared radiation 30 emanating along any radius from electrode 18, a solid portion of one or more of the plurality of radiation shields 24 blocks its path and reflects it back toward electrode 18. Because of the high mobility of the alkali metal atoms on the metal surfaces of the shields, the passage of such alkali metal atoms remains substantially unhindered.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A radiation shield adapted to be interposed between a reaction zone and a means for condensing an alkali metal vapor in a thermoelectric generator for converting heat energy directly to electrical energy, said radiation shield comprising a woven wire mesh screen, the spacing between the wires forming said mesh screen being such that said radiation shield reflects thermal radiation while permitting the passage of alkali metal vapor therethrough.

2. The radiation shield of claim 1 in which said spacing between the wires forming said mesh screen is from about 0.1 to about 1000 micrometers.

3. The radiation shield of claim 1 in which the wires forming said mesh screen have widths of from about 0.01 to about 2.0 millimeters.

4. The radiation shield of claim 1 in which said radiation shield substantially surrounds said reaction zone and extends substantially the length thereof.

5. The radiation shield of claim 1 in which said woven wire mesh screen is woven of wires from a metal selected from the group consisting of copper, silver, aluminum, nickel, molybdenum, and tungsten.

6. The radiation shield of claim 1 including a plurality of said woven wire mesh screens stacked in layers with wires in adjacent layers being offset from one another such that said radiation shield is substantially opaque to infrared radiation while permitting the passage of said alkali metal vapor.

7. A radiation shield adapted to be interposed between a reaction zone and a means for condensing an alkali metal vapor in a thermoelectric generator for converting heat energy directly to electrical energy, said radiation shield comprising a metal foil having a plurality of orifices formed therein, said orifices being of a size such that said radiation shield reflects thermal radiation while permitting the passage of alkali metal vapor therethrough.

8. The radiation shield of claim 7 in which said metal foil is fabricated from a metal selected from the group consisting of copper, silver, aluminum, nickel, molybdenum, and tungsten.

9. The radiation shield of claim 7 including a plurality of said metal foils stacked in layers with orifices in adjacent layers being offset from one another such that said radiation shield is substantially opaque to infrared radiation while permitting the passage of said alkali metal vapor.

10. The radiation shield of claim 7 in which said orifices have a width of from about 0.1 to about 1000 micrometers.

11. The radiation shield of claim 7 in which the spacing between said orifices is from about 0.01 to about 2.0 millimeters.

12. A thermoelectric generator wherein heat energy is converted directly to electrical energy comprising:
   a first reaction zone containing elemental alkali metal,
   a second reaction zone including an electrode in fluid communication with said first reaction zone,
   a reaction zone separator comprising a cationically conductive solid electrolyte,
   means for conducting electron flow between said first and second reaction zones,
   means for maintaining a temperature in said first reaction zone at least 100 degrees C. in excess of the lowest temperature in said second reaction zone,
   means for condensing elemental alkali metal vapor leaving said second reaction zone,
   means for returning condensed elemental alkali metal from said second reaction zone to said first reaction zone, and
   a radiation shield interposed between said second reaction zone and said condensing means for reflecting infrared radiation from said second reaction zone back toward said second reaction zone while permitting the passage of said alkali metal vapor to said condensing means, said radiation shield including a plurality of orifices spaced such that a substantial portion of said alkali metal vapor impinging upon said radiation shield is transported to and through said orifices.

13. The thermoelectric generator of claim 12 in which said orifices have a width of from about 0.1 to about 1000 micrometers.

14. The thermoelectric generator is claim 12 in which the spacing between said orifices is from about 0.01 to about 2.0 millimeters.

15. The thermoelectric generator of claim 12 in which said radiation shield substantially surrounds said second reaction zone and extends substantially the length thereof.

16. The thermoelectric generator of claim 12 in which said radiation shield comprises a woven wire mesh screen.

17. The thermoelectric generator of claim 16 in which said woven wire mesh screen is woven from a metal selected from the group consisting of copper, silver, aluminum, nickel, molybdenum, and tungsten.

18. The thermoelectric generator of claim 16 including a plurality of said woven wire mesh screens stacked in layers with wires in adjacent layers being offset from one another such that said radiation shield is substantially opaque to infrared radiation while permitting the passage of said alkali metal vapor.

19. The thermoelectric generator of claim 12 in which said radiation shield comprises a metal foil having a plurality of orifices formed therein.

20. The thermoelectric generator of claim 19 in which said metal foil is fabricated from a metal selected from the group consisting of copper, silver, aluminum, nickel, molybdenum, and tungsten.

21. The thermoelectric generator of claim 19 including a plurality of said metal foils stacked in layers with orifices in adjacent layers being offset from one another such that said radiation shield is substantially opaque to infrared radiation while permitting the passage of said alkali metal vapor.

* * * * *